(12) United States Patent
Lim et al.

(10) Patent No.: US 11,444,475 B2
(45) Date of Patent: Sep. 13, 2022

(54) METHOD AND APPARATUS FOR CHARGING BATTERY

(71) Applicant: Samsung Electronics Co., Ltd., Suwon-si (KR)

(72) Inventors: Ju Wan Lim, Suwon-si (KR); YoungJae Kim, Seoul (KR); Duk Jin Oh, Seoul (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 17/088,930

(22) Filed: Nov. 4, 2020

(65) Prior Publication Data

US 2021/0057921 A1   Feb. 25, 2021

Related U.S. Application Data

(63) Continuation of application No. 15/958,088, filed on Apr. 20, 2018, now Pat. No. 10,862,325.

(30) Foreign Application Priority Data

Dec. 7, 2017 (KR) .................. 10-2017-0167395

(51) Int. Cl.
| | | |
|---|---|---|
| *H02J 7/00* | (2006.01) | |
| *B60L 58/16* | (2019.01) | |
| *H01M 10/44* | (2006.01) | |
| *B60L 53/10* | (2019.01) | |

(Continued)

(52) U.S. Cl.
CPC .............. *H02J 7/007* (2013.01); *B60L 53/00* (2019.02); *B60L 53/11* (2019.02); *B60L 58/16* (2019.02); *H01M 10/44* (2013.01); *H01M 10/48* (2013.01); *H02J 7/0029* (2013.01); *H02J 7/0077* (2013.01); *H02J 7/00712* (2020.01);
(Continued)

(58) Field of Classification Search
CPC ...................................................... H02J 7/007
USPC .......................................................... 32/109
See application file for complete search history.

(56) References Cited

U.S. PATENT DOCUMENTS

| | | |
|---|---|---|
| 8,054,038 B2 | 11/2011 | Kelty et al. |
| 8,117,857 B2 | 2/2012 | Kelty et al. |
| 8,508,191 B2 | 8/2013 | Kim et al. |

(Continued)

FOREIGN PATENT DOCUMENTS

| | | |
|---|---|---|
| CN | 105323878 A | 2/2016 |
| JP | 2000-77172 A | 3/2000 |

(Continued)

OTHER PUBLICATIONS

European Office Action dated Dec. 6, 2021 in counterpart European Patent Application No. 18180744.7 (5 pages in English).

(Continued)

*Primary Examiner* — Edward Tso
*Assistant Examiner* — Ahmed H Omar
(74) *Attorney, Agent, or Firm* — NSIP Law

(57) ABSTRACT

A battery charging method and apparatus are provided. A setting value of charging control information is determined based on an overpotential value and a voltage value of a battery and is applied in the charging control information, and a voltage applied to charge the battery is controlled based on the charging control information that applies the setting value.

14 Claims, 7 Drawing Sheets

(51) Int. Cl.
  *H01M 10/48* (2006.01)
  *B60L 53/00* (2019.01)

(52) U.S. Cl.
  CPC ... *B60L 2240/545* (2013.01); *B60L 2240/547* (2013.01); *H01M 10/448* (2013.01); *H01M 10/486* (2013.01)

(56) References Cited

U.S. PATENT DOCUMENTS

| | | |
|---|---|---|
| 8,618,775 B2 | 12/2013 | Hermann et al. |
| 8,624,560 B2 | 1/2014 | Ungar et al. |
| 8,754,611 B2 | 6/2014 | Greening et al. |
| 8,961,203 B2 | 2/2015 | Lee |
| 8,972,213 B2 | 3/2015 | Zhang et al. |
| 9,153,991 B2 | 10/2015 | Chaturvedi et al. |
| 2009/0309547 A1* | 12/2009 | Nakatsuji ............ H02J 7/0086 320/164 |
| 2012/0032648 A1 | 2/2012 | Ghantous et al. |
| 2012/0043929 A1 | 2/2012 | Yazami |
| 2013/0185007 A1 | 7/2013 | Imre et al. |
| 2015/0340885 A1 | 11/2015 | Baek et al. |
| 2015/0377976 A1* | 12/2015 | Maluf ................... H02J 7/0047 702/63 |
| 2016/0302260 A1 | 10/2016 | Miller |
| 2017/0126023 A1 | 5/2017 | Jung |
| 2017/0310137 A1 | 10/2017 | Ha et al. |
| 2018/0034284 A1 | 2/2018 | Yebka et al. |
| 2019/0229378 A1 | 7/2019 | Zhang et al. |

FOREIGN PATENT DOCUMENTS

| | | |
|---|---|---|
| JP | 3918019 B2 | 5/2007 |
| JP | 5832149 B2 | 12/2015 |
| KR | 10-0221047 B1 | 9/1999 |
| KR | 10-0230586 B1 | 11/1999 |
| KR | 10-2012-0119058 A | 10/2012 |
| KR | 10-2012-0121037 A | 11/2012 |
| WO | WO 2016/113791 A1 | 7/2016 |

OTHER PUBLICATIONS

Notten, Peter HL et al. "Boostcharging Li-ion batteries: A challenging new charging concept." *Journal of Power Sources*, 145.1, 2005, (pp. 89-94).

Ayoub, Elie et al., "Review on The Charging Techniques of a Li-Ion Battery", *2015 Third International Conference on Technological Advances in Electrical, Electronics and Computer Engineering* (*TAEECE*), 2015 (pp. 50-55).

Extended European Search Report dated Oct. 8, 2018 in corresponding European Patent Application No. 18180744.7 (5 pages in English).

* cited by examiner

METHOD AND APPARATUS FOR CHARGING BATTERY

CROSS-REFERENCE TO RELATED APPLICATIONS

This application is a continuation of U.S. patent application Ser. No. 15/958,088 filed on Apr. 20, 2018 which claims the benefit under 35 USC § 119(a) of Korean Patent Application No. 10-2017-0167395, filed on Dec. 7, 2017, in the Korean Intellectual Property Office, the entire disclosure of which is incorporated herein by reference for all purposes.

BACKGROUND

1. Field

The following description relates to charging of a battery.

2. Description of Related Art

Various methods are used to charge a battery. In a constant current (CC)-constant voltage (CV) method, a battery is charged with a CC until a battery voltage reaches a preset voltage, and is then charged at a CV. In a varying current decay charging method, a battery is charged with a high current in a low state of charge (SOC) until the battery reaches a preset SOC, and is then charged with a gradually decreasing current. Battery may also be charger using a fast charging method to reduce an amount of time to charge a battery. When fast charging is repeated, a life of a battery is reduced.

In an existing fast charging method, the battery is charged by controlling a current supplied to the battery. Generally, the current supplied to the battery is controlled based on a charging current profile. In the fast charging method, the same charging current profile is used regardless of a temperature and/or a degradation level of the battery. For example, the same charging current profile may be used regardless of whether the degradation level of the battery is high or low, or regardless of whether the temperature of the battery is high or low. This may accelerate a degradation of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an general aspect, there is provided a battery charging method including determining a setting value of charging control information based on an overpotential value and a voltage value of a battery, applying the setting value in the charging control information, and controlling a voltage applied to charge the battery based on the charging control information that reflects the setting value.

The setting value may include at least one of a shift value to shift a voltage function of the charging control information or an initial value of a voltage sweep rate of the charging control information.

The voltage sweep rate may correspond to a rate at which the voltage increases.

The determining of the setting value may include deriving a time value corresponding to a sum of the voltage value and the overpotential value based on an inverse function of a voltage function of the charging control information, and determining the time value as a shift value to shift the voltage function.

The applying of the setting value may include shifting the voltage function based on the shift value.

The determining of the setting value may include identifying a voltage range among voltage ranges, the voltage range may include a sum of the voltage value and the overpotential value, and selecting a voltage sweep rate, from among voltage sweep rates, the voltage sweep rate corresponding to a boundary voltage value of the identified voltage range as an initial value of the voltage sweep rate of the charging control information, and wherein each of the voltage sweep rates may indicate a rate at which the voltage increases in each of the respective voltage ranges.

The applying of the setting value may include setting the initial value of the voltage sweep rate as a slope of a linear voltage function of the charging control information.

The voltage may constantly increase up to a boundary voltage value of a voltage range subsequent to the identified voltage range.

The battery charging method may include changing the voltage sweep rate of the charging control information from the selected voltage sweep rate to a voltage sweep rate corresponding to a boundary voltage value of a subsequent voltage range, in response to a charging voltage value of the battery being less than or equal to a boundary voltage value of a voltage range subsequent to the identified voltage range.

The battery charging method may include charging the battery at a constant voltage (CV), in response to a charging voltage value of the battery being greater than or equal to a threshold voltage value, and terminating the charging of the battery, in response to a current value of the battery being equal to a threshold current and the battery is being charged at the CV.

The overpotential value may be determined based on any one or any combination of a temperature and a degradation level of the battery within an overpotential range.

In another general aspect, there is provided a battery charging apparatus including a controller configured to determine a setting value of charging control information based on an overpotential value and a voltage value of a battery, apply the setting value in the charging control information, and control a voltage applied to charge the battery based on the charging control information that reflects the setting value.

The setting value may include at least one of a shift value to shift a voltage function of the charging control information or an initial value of a voltage sweep rate of the charging control information.

The voltage sweep rate may correspond to a rate at which the voltage increases.

The controller may be configured to derive a time value corresponding to a sum of the voltage value and the overpotential value based on an inverse function of a voltage function of the charging control information, and to determine the time value as a shift value to shift the voltage function.

The controller may be configured to shift the voltage function based on the shift value.

The controller may be configured to identify a voltage range among voltage ranges, the voltage range may include a sum of the voltage value and the overpotential value, and to select a voltage sweep rate, from among voltage sweep rates, the voltage sweep rate corresponding to a boundary voltage value of the identified voltage range as an initial value of the voltage sweep rate of the charging control information, and wherein each of the voltage sweep rates may indicate a rate at which the voltage increases in each of the respective voltage ranges.

The controller may be configured to set the initial value of the voltage sweep rate as a slope of a linear voltage function of charging control information.

The voltage may constantly increases up to a boundary voltage value of a voltage range subsequent to the identified voltage range.

The controller may be configured to change the voltage sweep rate of the charging control information from the selected voltage sweep rate to a voltage sweep rate corresponding to a boundary voltage value of a subsequent voltage range, in response to a charging voltage value of the battery being less than or equal to a boundary voltage value of a voltage range subsequent to the identified voltage range.

The overpotential value may be determined based on an one or any combination of a temperature and a degradation level of the battery within an preset overpotential range.

In another general aspect, there is provided a vehicle including a battery module, sensors configured to sense voltage values of the battery module, a memory configured to store instructions, and a battery charging apparatus implemented on a processor, the battery charging apparatus being configured to execute the instructions to determine a setting value based on an overpotential value and the voltage value of a battery, apply the setting value in the charging control information, and control a voltage applied to charge the battery based on the charging control information that reflects the setting value.

The battery charging apparatus may be configured to identify a voltage range may include a sum of the voltage values and a overpotential value, and select a voltage sweep rate corresponding to a boundary voltage value of the identified voltage range as an initial value of the voltage sweep rate of the charging control information, and the memory may be configured to store correspondence relationship between voltage sweep rates and boundary voltage values of voltage ranges.

Other features and aspects will be apparent from the following detailed description, the drawings, and the claims.

Figure 1:
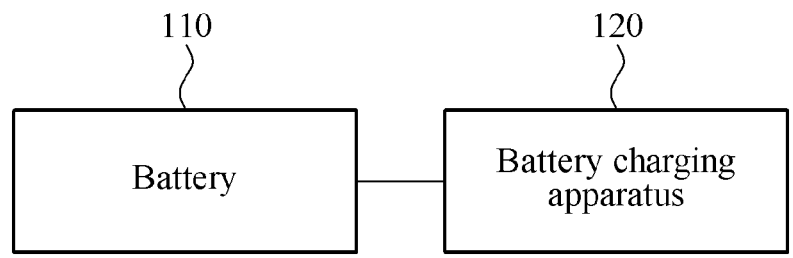
FIG. 1 illustrates an example of a battery charging device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made after gaining an understanding of the disclosure of this application.

The terminology used herein is for describing various examples only, and is not to be used to limit the disclosure. The articles "a," "an," and "the" are intended to include the plural forms as well, unless the context clearly indicates otherwise.

FIG. 1 illustrates an example of a battery charging device 100.

Referring to FIG. 1, the battery charging device 100 includes a battery 110 and a battery charging apparatus 120.

The battery 110 is, for example, at least one battery cell, at least one battery module, or at least one battery pack.

In an example, the battery charging apparatus 120 collects or acquires voltage data of the battery 110 using a voltage sensor. For example, the battery charging apparatus 120 receives the voltage data of the battery 110 from the voltage sensor. The voltage data includes at least one voltage value.

In an example, the battery charging apparatus 120 determines setting value of charging control information based on a voltage value and an overpotential value of the battery 110, reflects or applies the setting value to the charging control information, and charges the battery 110 based on the charging control information reflecting the setting value. An example of an overpotential value will be described below with reference to FIG. 9. The charging control information is information used to control charging of the battery 110. For example, the charging control information is information used to control a voltage applied to the battery 110 for charging of the battery 110.

In an example, the battery charging apparatus 120 determines a shift value based on the voltage value and the overpotential value, and reflects the shift value in a voltage function. In this example, the shift value is an example of the above-described setting value, and the voltage function is an example of the above-described charging control information. In an example, the battery charging apparatus 120 controls a voltage applied to the battery 110 using the voltage function reflecting the shift value, and charges the battery 110. This example will be further described below with reference to FIGS. 2 and 3.

In an example, the battery charging apparatus 120 determines an initial value of a voltage sweep rate of the charging control information based on the voltage value and the overpotential value, and reflects the initial value in the voltage sweep rate of the charging control information. The battery charging apparatus 120 controls a voltage applied to the battery 110 based on the charging control information reflecting the initial value, and charges the battery 110. This example will be further described below with reference to FIGS. 4, 5 and 6.

In an example, when a charging voltage value of the battery 110 reaches a threshold voltage during charging of the battery 110, the battery charging apparatus 120 charges the battery 110 at a constant voltage (CV). The threshold voltage is, for example, a final voltage or a maximum voltage. The charging voltage value corresponds to, for example, a result obtained by sensing a voltage of the battery 110 that is charging.

When a current value of the battery 110 reaches a threshold current during charging of the battery 110 at the CV, the battery charging apparatus 120 terminates the charging of the battery 110. The threshold current is, for example, a final current. The current value corresponds to, for example, a result obtained by sensing a current of the battery 110 that is charging at the CV.

Figure 2:
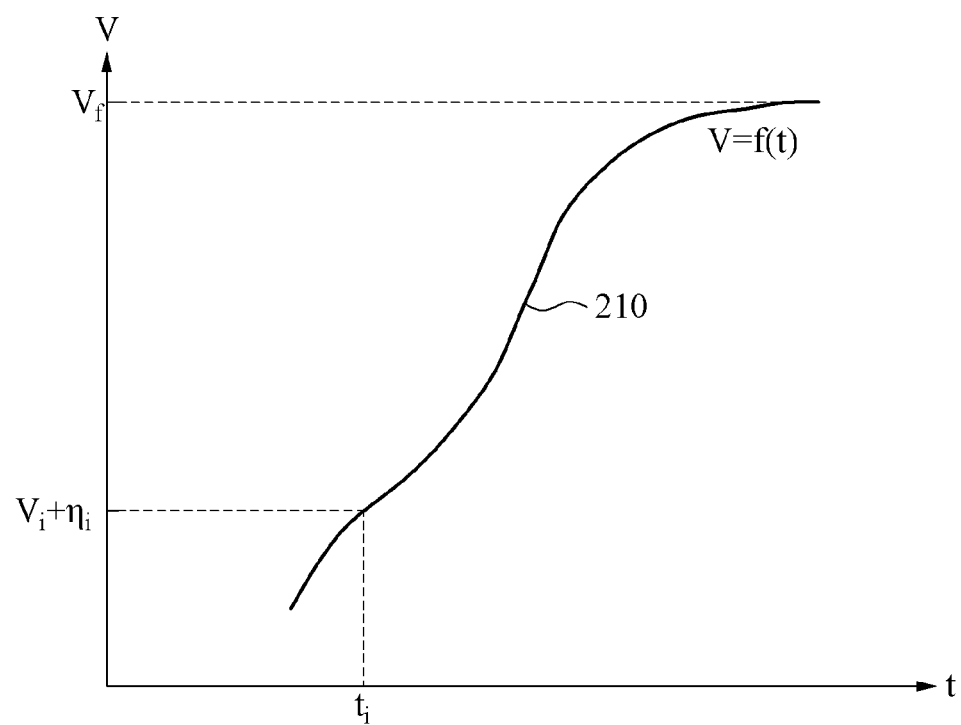
FIGS. 2 through 6 illustrate examples of a battery charging method.
Figure 3:
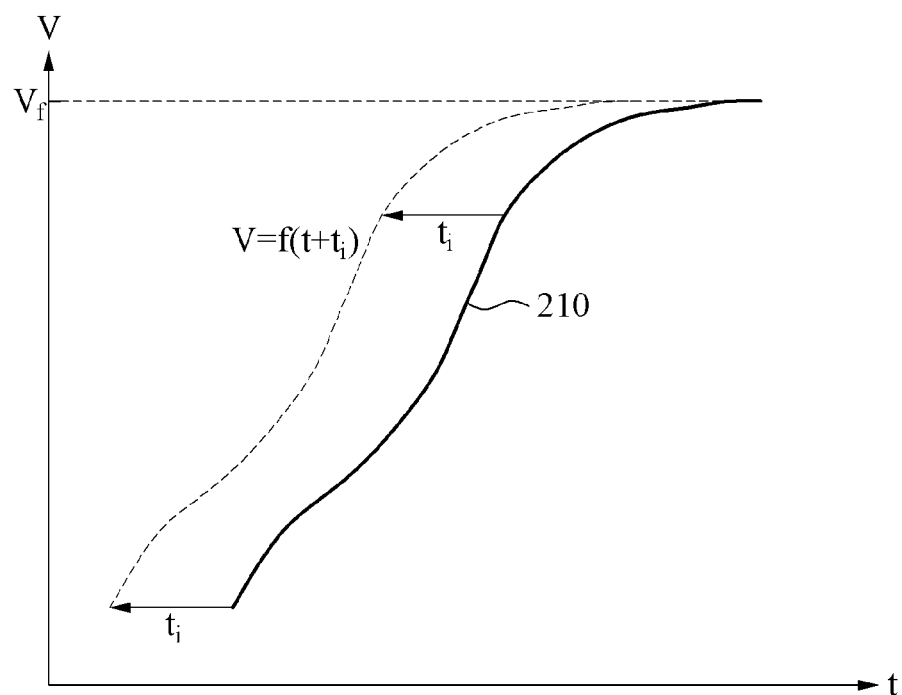

FIGS. 2 and 3 illustrate examples of a battery charging methods.

As described above with reference to FIG. 1, the battery charging apparatus 120 determines the setting value of the charging control information based on the voltage value and the overpotential value of the battery 110, and reflects the setting value in the charging control information. The charging control information includes, for example, a voltage function, and the setting value includes, for example, a shift value to shift a corresponding voltage function. Examples of operations of the battery charging apparatus 120 are described below with reference to FIGS. 2 and 3.

FIG. 2 illustrates an example of a voltage function V=f(t) 210. In the example of FIG. 2, when the battery 110 has a voltage value $V_i$ and an overpotential value $\eta_i$, the battery charging apparatus 120 derives a time value $t_i$ corresponding to $V_i+\eta_i$ that is a sum of the voltage value $V_i$ and the overpotential value $\eta_i$, using an inverse function of the voltage function V=f(t) 210. In this example, the time value $t_i$ is expressed using Equation 1 shown below.

$$t_i = f^{-1}(V_i+\eta_i)$$ [Equation 1]

The battery charging apparatus 120 determines the derived time value $t_i$ as a shift value.

The battery charging apparatus 120 reflects the shift value $t_i$ in the voltage function V=f(t) 210. For example, the battery charging apparatus 120 shifts the voltage function V=f(t) 210 based on the shift value $t_i$. Referring to FIG. 3, the battery charging apparatus 120 shifts the voltage function V=f(t) 210 to the left by the shift value $t_i$. A voltage function shifted as shown in FIG. 3 is expressed using Equation 2 shown below.

$$V = f(t+t_i)$$ [Equation 2]

The battery charging apparatus 120 charges the battery 110 based on the shifted voltage function. A voltage is applied to the battery 110 for charging of the battery 110, and the battery charging apparatus 120 controls the voltage applied to the battery 110 based on the shifted voltage function. For example, a voltage corresponding to "$V_i+\eta_i$" is applied first to the battery 110. The battery charging apparatus 120 sets a charging start voltage or an initial charging voltage to be "$V_i+\eta_i$", and allows a voltage corresponding to "$V_i+\eta_i$" to be applied first to the battery 110.

Also, the battery charging apparatus 120 charges the battery 110 by increasing the voltage applied to the battery 110 based on the shifted voltage function.

When a charging voltage value of the battery 110 reaches a threshold voltage during charging of the battery 110 based on the shifted voltage function, the battery charging apparatus 120 charges the battery 110 at a CV. For example, in FIG. 3, when a charging voltage value of the battery 110 reaches a threshold voltage $V_f$, the battery charging apparatus 120 charges the battery 110 at the threshold voltage $V_f$. In this example, a CV is applied to the battery 110.

When the battery 110 is charged at the CV, an amount of current supplied to the battery 110 gradually decreases. When a current value of the battery 110 reaches a threshold current $I_f$ during charging of the battery 110 at the CV, the battery charging apparatus 120 terminates the charging of the battery 110. The threshold current $I_f$ is, for example, a value set in advance.

Figure 4:
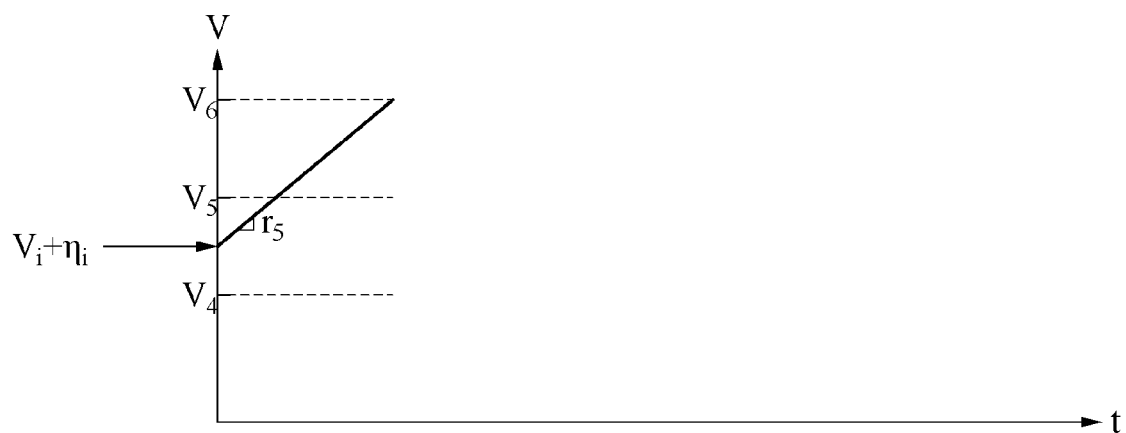
Figure 5:
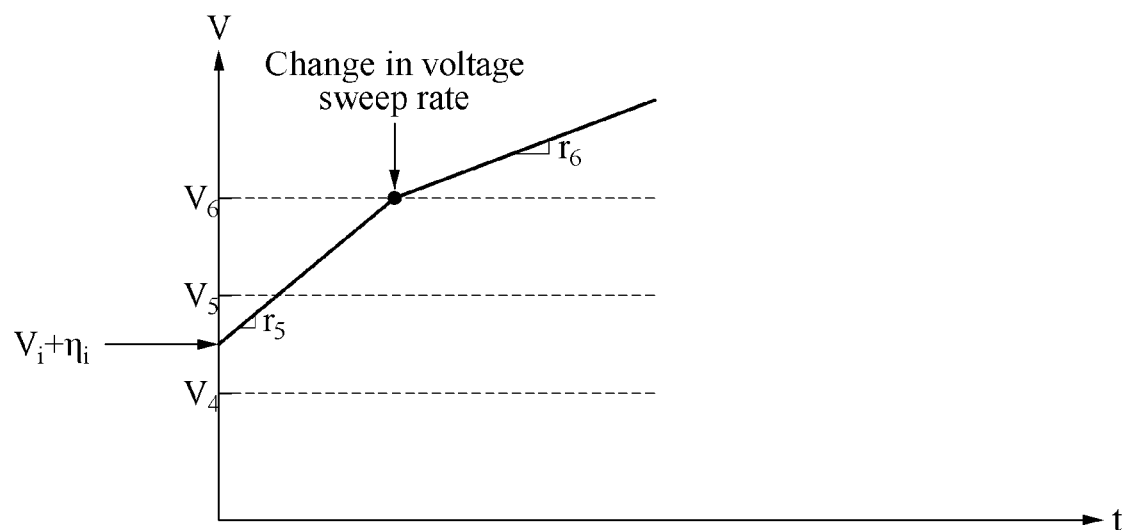
Figure 6:
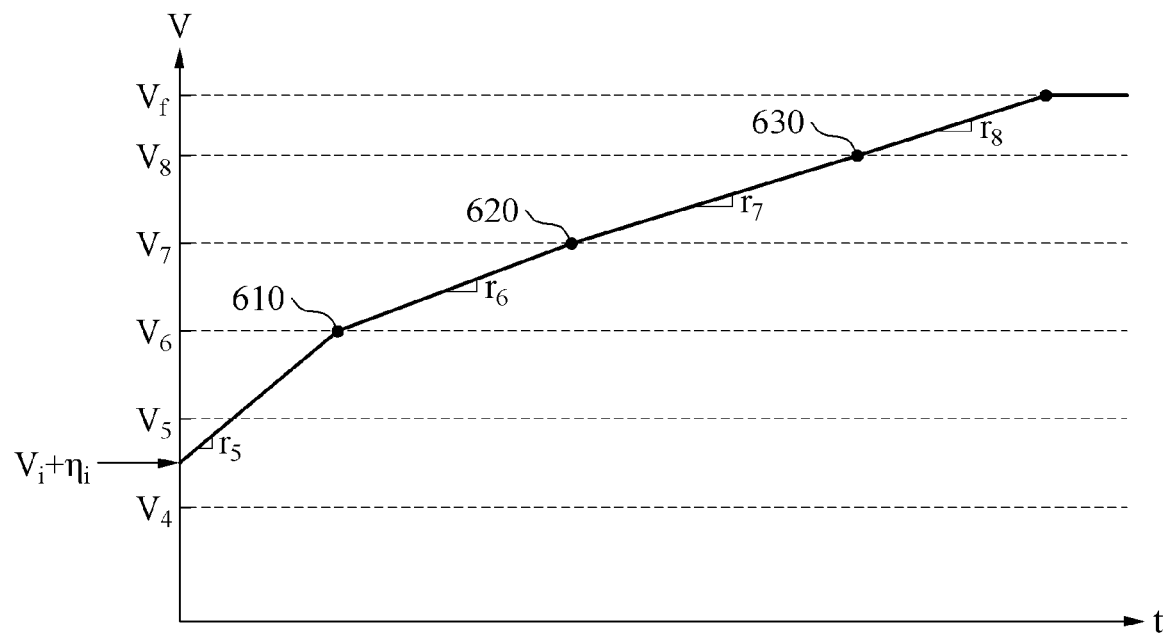

FIGS. 4 through 6 illustrate examples of a battery charging method.

As described above with reference to FIG. 1, the battery charging apparatus 120 determines an initial value of a voltage sweep rate of the charging control information based on a voltage value and an overpotential value of the battery 110, and reflects the initial value in the charging control information. Examples of operations of the battery charging apparatus 120 are described below with reference to FIGS. 4 through 6.

In an example of FIG. 4, when the battery 110 has a voltage value $V_i$ and an overpotential value $\eta_i$, a value of "$V_i+\eta_i$" is greater than $V_4$ and less than $V_5$. In this example, the battery charging apparatus 120 sets "n" that satisfies "$V_{n-1} \leq V_i+\eta_i < V_n$" to be "5" and selects a voltage sweep rate corresponding to "5" as an initial value of a voltage sweep rate of charging control information based on a table. The battery charging apparatus 120 identifies a voltage range of $V_4$ to $V_5$ including the value of "$V_i+\eta_i$" among preset voltage ranges, for example, a voltage range of $V_1$ to $V_2$ and a voltage range of $V_{n-1}$ to $V_n$, and selects a voltage sweep rate corresponding to a boundary voltage value of the identified voltage range of $V_4$ to $V_5$ as an initial value, based on the table. The table corresponds to, for example, a table that stores a correspondence relationship between voltage sweep rates and boundary voltage values $V_1$ to $V_n$ of voltage ranges. Each of the voltage sweep rates is a rate at which a voltage increases in each of the voltage ranges. Table 1 is shown below as an example of the table.

TABLE 1

| Boundary voltage value (V) | Voltage sweep rate (V/s) |
| --- | --- |
| $V_1$ = 3.40 V | $r_1$ = 5.000 × 10$^{-3}$ |
| $V_2$ = 3.60 V | $r_2$ = 1.330 × 10$^{-3}$ |
| $V_3$ = 3.72 V | $r_3$ = 0.371 × 10$^{-3}$ |
| $V_4$ = 3.84 V | $r_4$ = 0.231 × 10$^{-3}$ |
| $V_5$ = 3.96 V | $r_5$ = 0.123 × 10$^{-3}$ |
| $V_6$ = 4.05 V | $r_6$ = 0.096 × 10$^{-3}$ |
| $V_7$ = 4.13 V | $r_7$ = 0.052 × 10$^{-3}$ |
| $V_8$ = 4.18 V | $r_8$ = 0.018 × 10$^{-3}$ |

In the example of FIG. 4, the battery charging apparatus 120 selects $r_5$, and sets $r_5$ as an initial value of a voltage sweep rate of charging control information. Also, the battery charging apparatus 120 sets a charging start voltage in the charging control information to be "$V_i+\eta_i$." For example, the battery charging apparatus 120 sets a slope and an initial value of a function to be $r_5$ and "$V_i+\eta_i$," respectively, to determine a linear voltage function "$r_5 \times t + V_i + \eta_i$."

The battery charging apparatus 120 charges the battery 110 based on the charging control information with the set initial value of the voltage sweep rate and the set charging start voltage. In the example of FIG. 4, the battery charging apparatus 120 controls a voltage applied to the battery 110 based on the charging control information that reflects $r_5$ and "$V_i+\eta_i$," and charges the battery 110. For example, the battery charging apparatus 120 controls a voltage applied to the battery 110 based on the linear voltage function "$r_5 \times t + V_i + \eta_i$," and charges the battery 110. In this example, the voltage applied to the battery 110 increases at a rate of $r_5$ from "$V_i+\eta_i$." Also, the voltage applied to the battery 110 constantly increases up to a boundary voltage value $V_6$ (that is subsequent to $V_5$) of a voltage range of $V_5$ to $V_6$ subsequent to the identified voltage range of $V_4$ to $V_5$.

When a charging voltage value of the battery 110 reaches a subsequent boundary voltage value that is subsequent to a boundary voltage value corresponding to a determined voltage sweep rate, the battery charging apparatus 120 charges the battery 110 at a voltage sweep rate corresponding to the subsequent boundary voltage value. For example, when the charging voltage value of the battery 110 reaches a boundary voltage value of a subsequent voltage range that is subsequent to the identified voltage range, the battery charging apparatus 120 changes the voltage sweep rate and charges the battery 110. In an example of FIG. 5, when the charging voltage value of the battery 110 reaches $V_6$, the battery charging apparatus 120 changes a voltage sweep rate of charging control information from $r_5$ to $r_5$, and charges the battery 110. In this example, $V_6$ corresponds to a boundary voltage value subsequent to $V_5$. Referring to FIG. 6, when the charging voltage value of the battery 110 reaches $V_7$ during charging of the battery 110 at $r_6$, the battery charging apparatus 120 changes the voltage sweep rate of the charging control information from $r_6$ to $r_7$, and charges the battery 110. When the charging voltage value of the battery 110 reaches $V_8$ during charging of the battery 110 at $r_7$, the battery charging apparatus 120 changes the voltage sweep rate of the charging control information from $r_7$ to $r_8$, and charges the battery 110. FIG. 6 illustrates points 610, 620 and 630 at which the voltage sweep rate changes.

In the example of FIG. 6, when the charging voltage value of the battery 110 reaches a threshold voltage $V_f$ during charging of the battery 110 at $r_8$, the battery charging apparatus 120 charges the battery 110 at $V_f$. When a current value of the battery 110 reaches a threshold current $I_f$ during charging of the battery 110 at $V_f$, the battery charging apparatus 120 terminates the charging.

Figure 7:
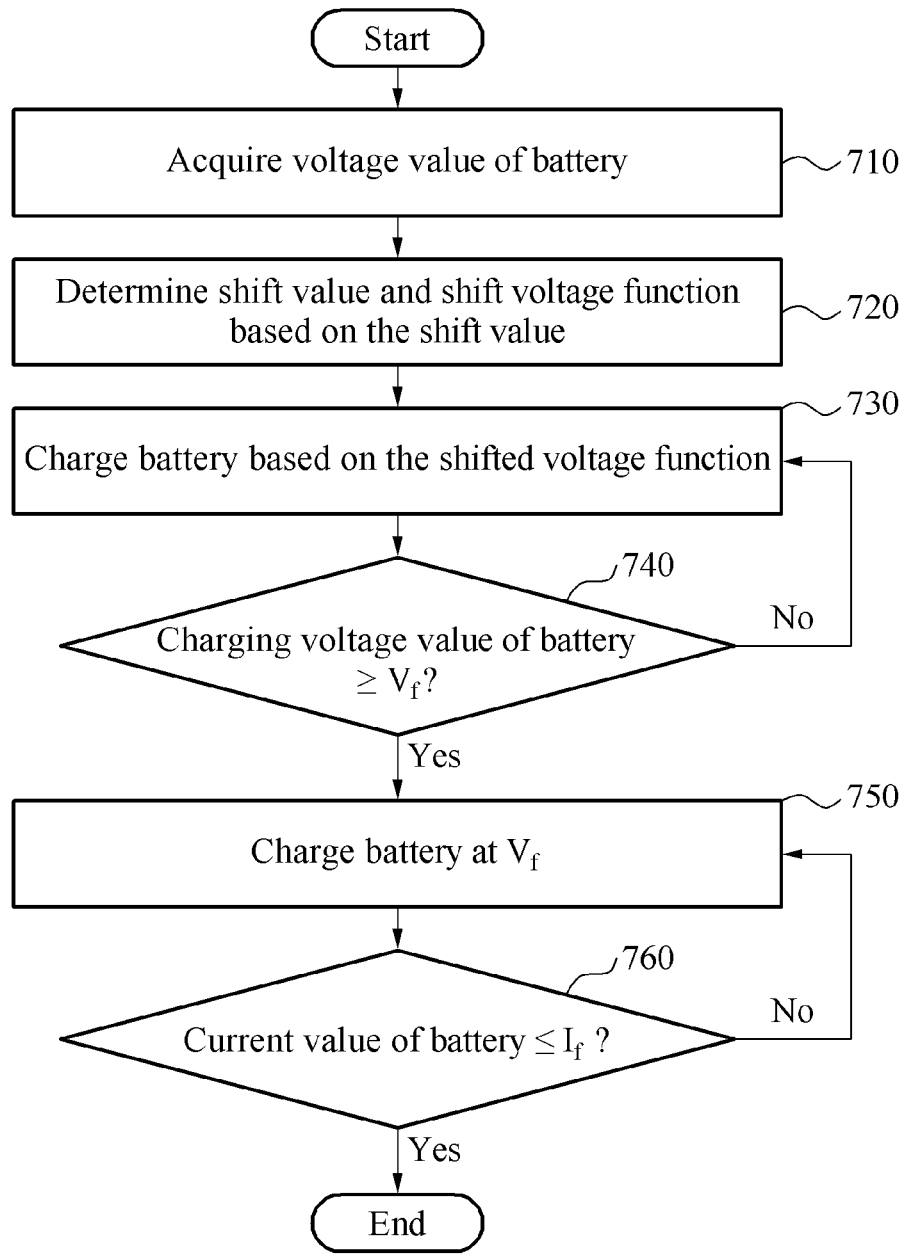
FIGS. 7 and 8 are diagrams illustrating examples of a battery charging method.
Figure 8:
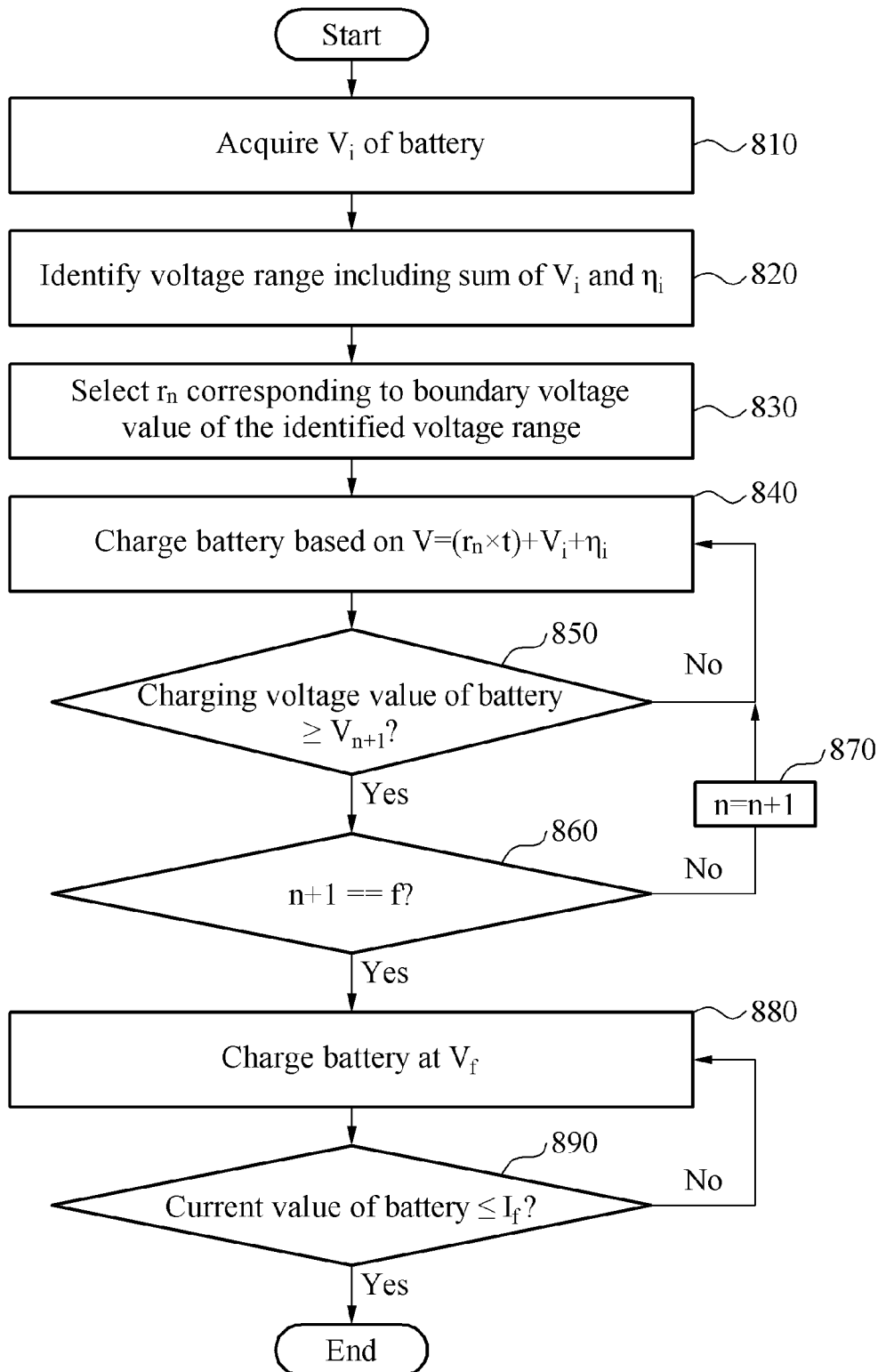

FIGS. 7 and 8 are diagrams illustrating examples of a battery charging method. The operations in FIGS. 7 and 8 may be performed in the sequence and manner as shown, although the order of some operations may be changed or some of the operations omitted without departing from the spirit and scope of the illustrative examples described. Many of the operations shown in FIGS. 7 and 8 may be performed in parallel or concurrently. One or more blocks of FIGS. 7 and 8, and combinations of the blocks, can be implemented by special purpose hardware-based computer that perform the specified functions, or combinations of special purpose hardware and computer instructions. In addition to the description of FIGS. 7 and 8 below, the descriptions of FIGS. 1-6 are also applicable to FIGS. 7 and 8, and are incorporated herein by reference. Thus, the above description may not be repeated here. In an example, a battery charging method of FIG. 7 corresponds to the examples of FIGS. 2 and 3.

Referring to FIG. 7, in operation 710, the battery charging apparatus 120 acquires a voltage value $V_i$ of the battery 110.

In operation 720, the battery charging apparatus 120 determines a shift value to shift a voltage function, and shifts a voltage function based on the shift value. As described above with reference to FIG. 2, the battery charging apparatus 120 derives a time value $t_i$ corresponding to a sum of the voltage value $V_i$ and an overpotential value $\eta_i$ of the battery 110 based on an inverse function of the voltage function, and determines the derived time value $t_i$ as a shift value. The battery charging apparatus 120 shifts the voltage function by the shift value $t_i$.

In operation 730, the battery charging apparatus 120 charges the battery 110 based on the shifted voltage function.

In operation 740, the battery charging apparatus 120 determines whether a charging voltage value of the battery 110 is greater than or equal to a threshold voltage $V_1$. In an example, when the charging voltage value of the battery 110 is determined to be less than the threshold voltage $V_f$ in operation 740, the battery charging apparatus 120 continues to charge the battery 110. In another example, when the charging voltage value of the battery 110 is determined to be greater than or equal to the threshold voltage $V_f$ in operation 740, the battery charging apparatus 120 charges the battery 110 at a CV $V_f$ in operation 750.

In operation 760, the battery charging apparatus 120 determines whether a current value of a current supplied to the battery 110 (for example, a charging current) is less than or equal to a threshold current $I_f$. In an example, when the current value is determined to be greater than the threshold current $I_f$ in operation 760, the battery charging apparatus 120 continues to charge the battery 110 at the CV $V_1$. In another example, when the current value is determined to be less than or equal to the threshold current $I_f$ in operation 760, the battery charging apparatus 120 terminates the charging of the battery 110.

In an example, a battery charging method of FIG. 8 corresponds to the examples of FIGS. 4 through 6.

Referring to FIG. 8, in operation 810, the battery charging apparatus 120 acquires a voltage value $V_i$ of the battery 110.

In operation 820, the battery charging apparatus 120 identifies a voltage range including a sum of the voltage value $V_i$ and an overpotential value q of the battery 110.

When the voltage range with "$V_i+\eta_i$" is identified to be a range of $V_{n-1}$ to $V_n$ in operation 820, in operation 830, the battery charging apparatus 120 selects a voltage sweep rate $r_n$ corresponding to a boundary voltage value $V_n$ of the identified voltage range of $V_{n-1}$ to $V_n$.

In operation 840, the battery charging apparatus 120 charges the battery 110 based on a voltage function $V=(r_n \times t)+V_i+\eta_i$ that reflects the voltage sweep rate $r_n$ and "$V_i+\eta_i$."

In operation 850, the battery charging apparatus 120 determines whether a charging voltage value of the battery 110 is greater than or equal to a boundary voltage value $V_{n+1}$. The boundary voltage value $V_{n+1}$ corresponds to a boundary voltage value subsequent to the boundary voltage value $V_n$, which corresponds to the voltage sweep rate $r_n$.

When the charging voltage value of the battery 110 is determined to be greater than or equal to the boundary voltage value $V_{n+1}$, in operation 860, the battery charging apparatus 120 determines whether index "n+1" of $V_{n+1}$ corresponds to a final index f. For example, in operation 860, the battery charging apparatus 120 determines the charging voltage value of the battery 110 reaches a threshold voltage $V_f$.

In an example, in operation 860, when the index "n+1" is determined not to correspond to the final index f, i.e., when the charging voltage value of the battery 110 is less than the threshold voltage $V_f$, in operation 870, the battery charging apparatus 120 updates "n" to "n+1". In this example, the battery charging apparatus 120 changes the voltage sweep rate $r_n$ to $r_{n+1}$ and charges the battery 110.

In another example, when the index "n+1" is determined to correspond to the final index fin operation 860, i.e., when the charging voltage value of the battery 110 reaches the threshold voltage $V_f$, in operation 880, the battery charging apparatus 120 charges the battery 110 at a CV $V_f$.

In operation 890, the battery charging apparatus 120 determines whether a current value of a current supplied to the battery 110 (for example, a charging current) is less than or equal to a threshold current $I_f$. In an example, when the current value is determined to be less than or equal to the threshold current $I_f$ in operation 890, the battery charging apparatus 120 terminates the charging of the battery 110.

Figure 9:
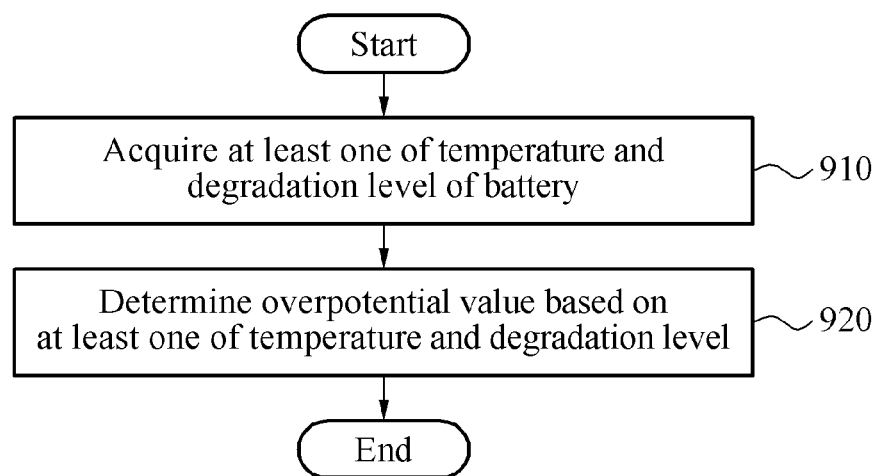
FIG. 9 illustrates an example of determining an overpotential value in a battery charging apparatus.

FIG. 9 illustrates an example of determining an overpotential value in a battery charging apparatus. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

The overpotential value described above with reference to FIGS. 1 through 8 is a value in an overpotential range of 0 V to 1.5 V or of 0.2 V to 0.5 V, and is, for example, 0.4 V. Depending on examples, the battery charging apparatus 120 determines an overpotential value suitable for a current state of the battery 110 within a corresponding overpotential range, which will be described below with reference to FIG. 9.

Referring to FIG. 9, in operation 910, the battery charging apparatus 120 acquires at least one of a temperature and information about a degradation level of the battery 110. For example, the battery charging apparatus 120 determines the degradation level or a degradation state of the battery 110 using a degradation estimation model or a degradation estimation algorithm, or receives the information about the degradation level of the battery 110 from another device or sensor. In an example, the battery charging apparatus 120 acquires or collects the temperature of the battery 110 using a temperature sensor.

In operation 920, the battery charging apparatus 120 determines an overpotential value based on at least one of the temperature and the degradation level of the battery 110. For example, the battery charging apparatus 120 determines an overpotential value within an overpotential range of 0 V to 1.5 V or an overpotential range of 0.2 V to 0.5 V based on either one or both of the temperature and the degradation level of the battery 110. In an example, when the degradation level of the battery 110 is greater than a reference degradation level, the battery charging apparatus 120 determines an overpotential to have a relatively high value. In another example, when the temperature of the battery 110 is less than a reference temperature, the battery charging apparatus 120 determines an overpotential to have a relatively low value. The battery charging apparatus 120 determines an appropriate overpotential value based on either one or both of the temperature and the degradation level of the battery 110.

Figure 10:
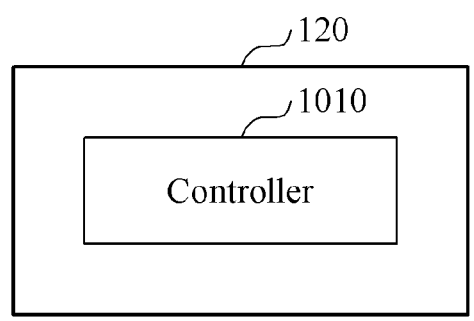
FIG. 10 is a diagram illustrating an example of a battery charging apparatus.

FIG. 10 is a diagram illustrating an example of the battery charging apparatus 120.

Referring to FIG. 10, the battery charging apparatus 120 includes a controller 1010.

In an example, the controller 1010 performs the operations of the battery charging apparatus 120 described above with reference to FIGS. 1 through 9. For example, the controller 1010 determines a setting value of charging control information based on a voltage value and an overpotential value of the battery 110, and reflects the setting value in the charging control information. In an example, the controller 1010 controls a voltage applied to the battery 110 based on the charging control information reflecting the setting value, and charges the battery 110.

The battery charging apparatus 120 further includes a memory (not shown). The memory stores a table (for example, Table 1 shown above) that stores a correspondence relationship between voltage sweep rates and boundary voltage values of voltage ranges. Further description of the memory is provided below.

The above description of FIGS. 1 through 9 is also applicable to FIG. 10, and accordingly is not repeated here.

The battery charging apparatus 120 is included in, for example, various electronic devices, such as, for example, a vehicle, an energy storage system, a walking assistance apparatus, a drone or a mobile terminal, and performs the operations described above with reference to FIGS. 1 through 10.

In an example, the battery charging apparatus 120 is external to the vehicle or the mobile terminal, and is disposed in a device, such as, for example, a computer, a server, and a mobile phone, and communicates with the vehicle or the mobile terminal through wireless communication or network communication consistent with the disclosed herein.

Hereinafter, an example in which the battery charging apparatus 120 is included in a vehicle, and an example in which the battery charging apparatus 120 is included in a mobile terminal are described with reference to FIGS. 11 and 12, respectively. Description of FIGS. 11 and 12 is also applicable to other electronic devices.

Figure 11:
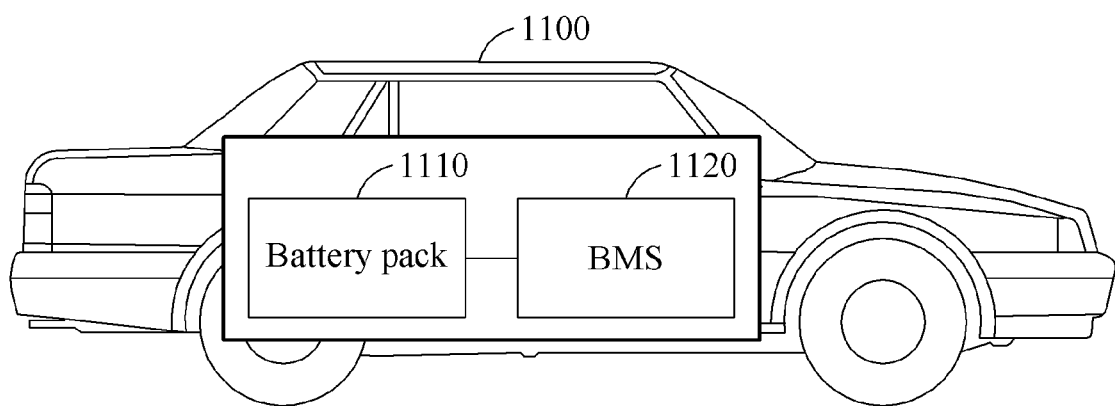
FIG. 11 illustrates an example of a vehicle including a battery pack and a battery management system (BMS).
Figure 12:
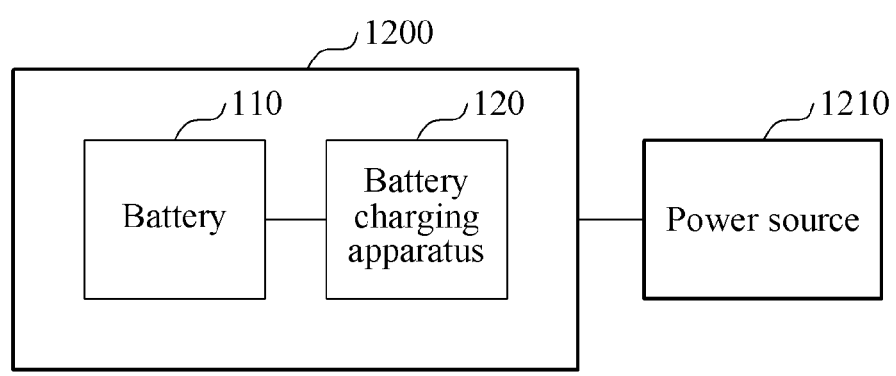
FIG. 12 illustrates an example of a mobile terminal.

FIG. 11 illustrates an example of a vehicle 1100. The vehicle 1100 described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone.

Referring to FIG. 11, the vehicle 1100 includes a battery pack 1110 and a battery management system (BMS) 1120. The vehicle 1100 uses the battery pack 1110 as a power source.

The BMS 1120 monitors whether an abnormality occurs in the battery pack 1110, and prevents the battery pack 1110 from being overcharged or over-discharged. Also, the BMS 1120 performs a thermal control on the battery pack 1110 when a temperature of the battery pack 1110 exceeds a first temperature (for example, 40° C.) or is less than a second temperature (for example, −10° C.). Furthermore, the BMS 1120 performs cell balancing to equalize states of charge of battery cells included in the battery pack 1110.

In an example, the BMS 1120 performs operations of the battery charging apparatus 120. When the vehicle 1100 is connected to a power source, the BMS 1120 charges the battery pack 1110 based on the above-described battery charging methods. The power source is, for example, a source to supply a direct current (DC) power or an alternating current (AC) power.

In another example, the battery charging apparatus 120 is physically separated from the BMS 1120. For example, the battery charging apparatus 120 is included as an on-board charger in the vehicle 1110.

FIG. 12 illustrates an example of a mobile terminal 1200. FIG. 12 illustrates the mobile terminal 1200 and a power source 1210. In an example, the battery charging apparatus 120 disclosed herein is incorporated in various types of mobile terminals 1200 such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, other consumer electronics/information technology(CE/IT) device, or any other device capable of wireless communication or network communication consistent with that disclosed herein. However, the mobile terminal 1200 is not limited to the examples described in the forgoing.

In an example, the mobile terminal 1200 includes the battery 110 and the battery charging apparatus 120. When the mobile terminal 1200 is connected to the power source 1210 via a wire or wirelessly, the battery charging apparatus 120 performs the above-described battery charging methods.

To extend a period of use of the battery 110 in the fast charging method, the charging current profile needs to change based on the temperature and/or the degradation level of the battery 110. Also, in an example of a relatively high degradation level and a relatively low temperature of the battery 110, the battery 110 is charged based on the same charging current profile in the fast charging method, and accordingly an overpotential is applied to the battery 110. Thus, a side reaction may occur in the battery 110, and the degradation of the battery 110 may be accelerated.

According to examples, the battery charging apparatus 120 charges the battery 110 based on a charging voltage profile rather than the charging current profile. In an example, the charging voltage profile corresponds to the above-described charging control information. The acceleration of degradation of the battery 110 may be prevented, even if the battery 110 is charged based on the same charging voltage profile at different temperatures and/or different degradation levels of the battery 110, and thus a user may use the battery 110 for a longer period of time, instead of needing to change the charging voltage profile. Also, the battery charging apparatus 120 applies an overpotential (for example, an overpotential with an overpotential value $\eta_i$) regardless of a temperature and/or a degradation level of the battery 110, and accordingly a side reaction in the battery 110 is relatively inhibited. Thus, the acceleration of the degradation of the battery 110 is mitigated or prevented.

The battery device 100, the battery charging apparatus 120, the BMS 1120, the mobile terminal 1200, and other apparatuses, units, modules, devices, and other components described herein with respect to FIGS. 1 and 10 through 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7 through 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery charging apparatus comprising:
   a controller configured to
      charge a battery using a charging voltage profile indicating a change in a charging voltage over time, wherein initial charging voltage of the charging voltage profile is determined based on an overpotential value and a voltage value of the battery,
      in response to a charging voltage being greater than or equal to a threshold voltage during charging of the battery, charge the battery at a constant voltage (CV), and
      terminate the charging at the CV, in response to a current of the battery being equal to a threshold current during charging of the battery at the CV,
      wherein the overpotential value is determined based on any one or any combination of the temperature and a degradation level of the battery within an overpotential range.

2. The battery charging apparatus of claim 1, wherein the controller is further configured to control a voltage applied to charge the battery based on the charging voltage profile.

3. The battery charging apparatus of claim 1, wherein the charging voltage profile includes a time-shifted voltage function.

4. The battery charging apparatus of claim 2, wherein the controller is further configured to:
   calculate a time value based on an inverse function of a voltage function, the voltage value, and the overpotential value, and determine the time-shifted voltage function by shifting the voltage function based on the calculated time value.

5. The battery charging apparatus of claim 1, wherein, for charging the battery using the charging voltage profile, the controller is further configured to control a battery charging such that the initial charging voltage is applied to the battery, and control the battery charging such that a voltage being applied to the battery increase at a first voltage sweep rate.

6. The battery charging apparatus of claim 5,
wherein the controller is further configured to change the first voltage sweep rate to a second voltage sweep rate when the voltage being applied to the battery reaches a boundary voltage value corresponding the first voltage sweep rate.

7. The battery charging apparatus of claim 6, wherein the second voltage sweep rate is less than the first voltage sweep rate.

8. A battery charging method comprising:
charging a battery using a charging voltage profile indicating a change in a charging voltage over time, wherein initial charging voltage of the charging voltage profile is determined based on an overpotential value and a voltage value of the battery,
in response to a charging voltage being greater than or equal to a threshold voltage during charging of the battery, charging the battery at a constant voltage (CV), and
terminating the charging at the CV, in response to a current of the battery being equal to a threshold current during charging of the battery at the CV,
wherein the overpotential value is determined based on any one ore any combination of a temperature and a degradation level of the battery within an overpotential range.

9. The battery charging method of claim 8, wherein the charging of the battery using a charging voltage profile comprises controlling a voltage applied to charge the battery based on the charging voltage profile.

10. The battery charging method of claim 8, wherein the charging voltage profile includes a time-shifted voltage function.

11. The battery charging method of claim 10, further comprises:
calculating a time value based on an inverse function of a voltage function, the voltage value, and the overpotential value, and
determining the time-shifted voltage function by shifting the voltage function based on the calculated time value.

12. The battery charging method of claim 8, wherein the charging of the battery using a charging voltage profile comprises:
controlling a battery charging such that the initial charging voltage is applied to the battery; and controlling the battery charging such that a voltage being applied to the battery increase at a first voltage sweep rate.

13. The battery charging method of claim 12, further comprises changing the first voltage sweep rate to a second voltage sweep rate when the voltage being applied to the battery reaches a boundary voltage value corresponding the first voltage sweep rate.

14. The battery charging method of claim 13, wherein the second voltage sweep rate is less than the first voltage sweep rate.

* * * * *